United States Patent
Weaver et al.

(10) Patent No.: US 8,385,065 B2
(45) Date of Patent: Feb. 26, 2013

(54) GIMBAL SYSTEM WITH FORCED FLOW OF EXTERNAL AIR THROUGH A CHANNEL TO REMOVE HEAT

(75) Inventors: James H. Weaver, West Linn, OR (US); Gerard A. Morelli, Beaverton, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 220 days.

(21) Appl. No.: 13/009,753

(22) Filed: Jan. 19, 2011

(65) Prior Publication Data

US 2011/0205703 A1    Aug. 25, 2011

Related U.S. Application Data

(60) Provisional application No. 61/296,336, filed on Jan. 19, 2010.

(51) Int. Cl.
  *H05K 7/20* (2006.01)
  *F16M 13/00* (2006.01)
  *F28D 15/00* (2006.01)

(52) U.S. Cl. .......... 361/695; 361/679.46; 361/690; 361/694; 165/80.3; 165/104.33; 165/185; 165/122; 454/184; 348/169; 348/143; 348/373; 248/276.1; 248/299.1

(58) Field of Classification Search .. 361/679.46–679.5, 361/690–697, 714–719, 724–727; 165/80.2, 165/80.3, 104.33, 121–126, 185; 454/184; 348/143, 169, 151, 373; 248/276.1, 299.1, 248/274.1, 283.1, 179.1, 189.1, 127, 660, 248/184.1; 285/41, 57; 244/3.1, 158.1, 164, 244/165, 75.1, 76 R, 79
See application file for complete search history.

(56) References Cited

U.S. PATENT DOCUMENTS

| | | | |
|---|---|---|---|
| 4,520,973 A | | 6/1985 | Clark et al. |
| 4,920,367 A * | | 4/1990 | Pagano ................ 396/427 |
| 5,153,623 A * | | 10/1992 | Bouvier ............... 396/427 |
| 5,394,184 A * | | 2/1995 | Anderson et al. ....... 348/151 |
| 6,061,087 A * | | 5/2000 | Schieltz et al. ........ 348/151 |
| 7,159,645 B1 * | | 1/2007 | Go et al. ............. 165/82 |
| 7,264,220 B2 * | | 9/2007 | Dent et al. ........... 248/660 |
| 7,671,311 B2 * | | 3/2010 | Ellison et al. ......... 244/3.1 |
| 7,699,691 B1 * | | 4/2010 | Voigt et al. .......... 454/184 |
| 2001/0022627 A1 * | | 9/2001 | Bernhardt ............ 348/373 |
| 2006/0071121 A1 | | 4/2006 | Wescott et al. |
| 2006/0071134 A1 * | | 4/2006 | Dent et al. ........... 248/274.1 |
| 2006/0199498 A1 | | 9/2006 | Shipley et al. |
| 2007/0194170 A1 * | | 8/2007 | Ellison et al. ......... 244/3.1 |
| 2007/0241244 A1 * | | 10/2007 | Tavassoli Hozouri .... 248/183.1 |

OTHER PUBLICATIONS

Young, Lee W., Authorized officer, International Searching Authority, International Search Report, PCT Application Serial No. PCT/US2011/021746; search completion date: Mar. 2, 2011; search mailing date: Mar. 18, 2011.

Young, Lee W., Authorized officer, International Searching Authority, Written Opinion of the International Searching Authority, PCT Application Serial No. PCT/US2011/021746; opinion completion date: Mar. 2, 2011; opinion mailing date: Mar. 18, 2011.

* cited by examiner

*Primary Examiner* — Michail V Datskovskiy
(74) *Attorney, Agent, or Firm* — Kolisch Hartwell, P.C.

(57) ABSTRACT

Gimbal system, including apparatus and methods, with forced flow of external air through a channel to remove heat. The system may comprise a support portion including at least one electronic component and defining a channel, a gimbal assembly pivotably connected to and supported by the support portion, and a payload pivotably orientable with respect to the support portion by the gimbal assembly. The support portion alone or collectively with the gimbal assembly may define a chamber in which the electronic component is disposed. The support portion may include a forced-air device configured to drive flow of external air through the channel, thereby removing heat transferred to the channel from the electronic component.

24 Claims, 4 Drawing Sheets

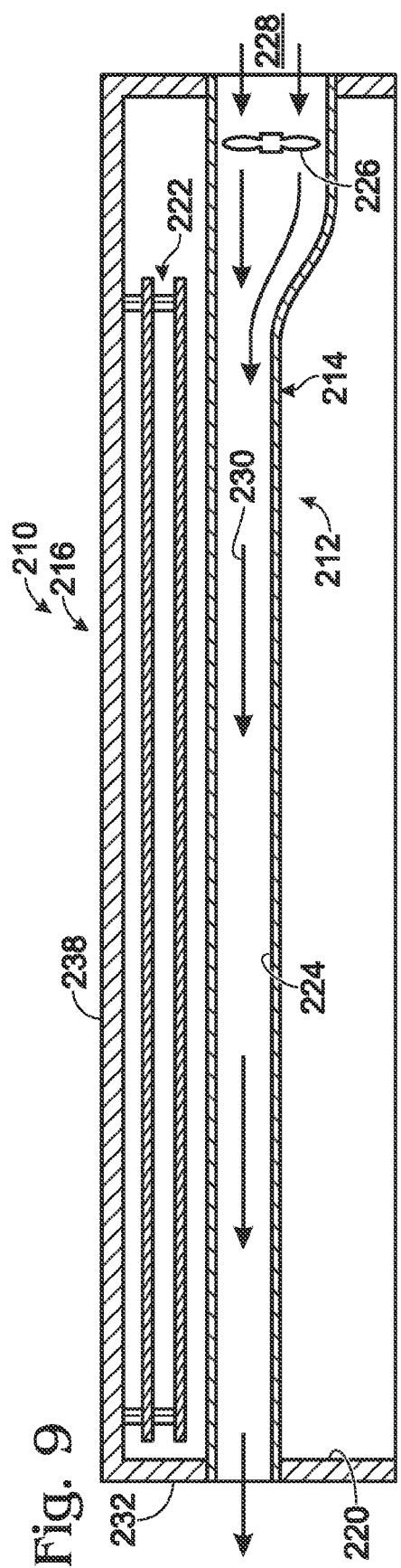

GIMBAL SYSTEM WITH FORCED FLOW OF EXTERNAL AIR THROUGH A CHANNEL TO REMOVE HEAT

CROSS-REFERENCE TO RELATED APPLICATION

This application is based upon and claims the benefit under 35 U.S.C. §119(e) of U.S. Provisional Patent Application Ser. No. 61/296,336, filed Jan. 19, 2010, which is incorporated herein by reference in its entirety for all purposes.

INTRODUCTION

Gimbal systems permit payloads, such as optical devices (e.g., cameras and lasers), to be mounted to and used on a support platform. For example, vehicles, such as aircraft, watercraft, and ground vehicles, may provide moving support platforms for gimbal systems. Alternatively, a gimbal system may be mounted to a stationary support platform, such as a tower, wall, or building. Whether moving or stationary, a gimbal system may enable a payload to be accurately reoriented with respect to the support platform. As an example, the payload may include a camera that can be panned and tilted with respect to the support platform to survey or monitor a broad field of view.

A gimbal system may be structured as a set of separate units, termed "line replaceable units," that are in communication with one another. For example, the gimbal system may be composed of (1) a turret unit (also termed a gimbal apparatus) that supports and orients a payload, (2) a user interface unit to permit an operator to control aspects of turret unit operation, and (3) a central electronics unit that provides additional electronic circuitry for gimbal system operation. When carried by a vehicle, the turret unit may be mounted to the exterior of the vehicle, and the user interface unit and the central electronics unit may be located inside the vehicle.

The turret unit may have a compact, aerodynamic configuration, with sensitive components, such as electronics and/or the payload, enclosed for protection from ambient (external) air, to minimize exposure to moisture, salt, particulates, etc. Unfortunately, such an enclosed configuration may limit the ability of the turret unit to release heat, particularly when the support platform is not in motion.

A gimbal system with three separate units could be simplified by eliminating one of the units. In particular, the central electronics unit could be removed from the system by transferring this unit's electronics and functionality to the turret unit. However, placement of these electronics into an enclosed environment within the turret unit would be expected to exacerbate any tendency of the turret unit to overheat. Venting the electronics to the external air could dissipate heat more efficiently. However, such venting would expose the electronics to unacceptable levels of moisture and contaminants, such as rain, ice, dust, and debris. Alternatively, the turret unit could be equipped with external fins to reduce thermal resistance and facilitate heat transfer to the environment, but fins may be inadequate or undesirable. For example, fins that are large enough to be effective may affect aerodynamics and/or add substantial weight. Also, the effectiveness of fins may be hampered if air movement around the fins is limited, such as if the fins are obscured by adjacent walls or fairings. Therefore, other approaches for removing heat from a gimbal system are needed.

SUMMARY

The present disclosure provides a gimbal system, including apparatus and methods, with forced flow of external air through a channel to remove heat. The system may comprise a support portion including at least one electronic component and defining a channel, a gimbal assembly pivotably connected to and supported by the support portion, and a payload pivotably orientable with respect to the support portion by the gimbal assembly. The support portion alone or collectively with the gimbal assembly may define a chamber in which the electronic component is disposed. The support portion may include a forced-air device configured to drive flow of external air through the channel, thereby removing heat transferred to the channel from the electronic component.

BRIEF DESCRIPTION OF THE DRAWINGS

FIG. 9 is a sectional view of the turret unit of FIG. 8, taken generally along line 9-9 of FIG. 8 through a channel of the forced-air assembly.

DETAILED DESCRIPTION

Figure 1:
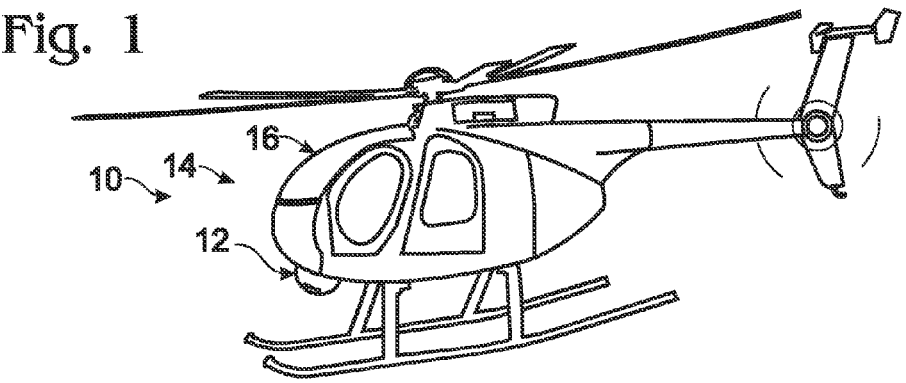
FIG. 1 is a view of an exemplary gimbal system including a turret unit mounted to an exterior of a support platform (namely, a helicopter) and equipped with a forced-air assembly that removes heat by driving external air through a channel, in accordance with aspects of the present disclosure.

The present disclosure provides a gimbal system, including apparatus and methods, with forced flow of external air through a channel to remove heat from the gimbal system, such as heat generated by at least one electronic component thereof, to reduce overheating of the electronic component.

The gimbal system may comprise a support portion including at least one electronic component and defining a channel. The gimbal system also may comprise a gimbal assembly pivotably connected to and supported by the support portion. The gimbal system further may comprise a payload, such as an optical detection device, which may (or may not) be in communication with the electronic component. The payload may be supported by the gimbal assembly and pivotably orientable with respect to the support portion about a pair of nonparallel axes by controlled driven motion of the gimbal assembly, to provide pan and tilt movement of the payload. The support portion alone or collectively with the gimbal assembly may define a chamber that is isolated from the channel and in which the electronic component is disposed. The support portion may include a forced-air device configured to drive flow of external air through the channel, thereby removing heat transferred to the channel from the electronic component. In some embodiments, the support portion may define a channel that extends at least substantially (e.g., at least halfway) around the chamber and that is separated from the chamber by at least one wall. The channel may not communicate substantially with the chamber at any position along the channel. For example, the channel may be separated from the chamber by at least one wall at every position along the channel.

A method of cooling a gimbal system is provided. In the method, a gimbal system having any combination of the components and features disclosed herein, such as the channel and chamber described above, may be provided. External air may be driven through the channel while remaining at least substantially isolated from the chamber. For example, external air may be driven through the channel such that no more than a minor fraction of the driven air (e.g., less than 1%) enters the chamber. In some embodiments, the step of driving external air may be stopped automatically in response to one or more predefined conditions. The predefined conditions may include at least one predefined condition related to a traveling speed of a support platform, ambient air speed, ambient temperature, a temperature associated with the gimbal system, or a combination thereof, among others.

The gimbal system of the present disclosure may offer substantial advantages. For example, the gimbal system may reduce the tendency of electronics (e.g., central and/or control electronics) in the support portion to overheat, by lowering thermal resistance at heat rejection surfaces, such as by creating a channel around these surfaces. External air may be driven through the channel around the perimeter of the support portion by a fan that provides forced-air cooling at all times or on demand. This cooling configuration may allow internal gas in the chamber (e.g., air, nitrogen, an inert gas, a combination thereof, etc.) to remain isolated and desiccated, enhancing the reliability of the electronics and simultaneously assuring cooling under various installation conditions. Furthermore, a fan may provide active cooling directed to the point of need that differs from passive cooling by fins, which may be only marginally effective and dependent on wind speed and/or direction.

Further aspects of the present disclosure are described in the following sections, including (I) definitions, (II) overview of an exemplary gimbal system, (III) support portions, (IV) gimbal assemblies, (V) payloads, (VI) forced air and thermal regulation systems, (VII) support platforms, and (VIII) examples.

I. DEFINITIONS

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet radiation—Invisible electromagnetic radiation having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light—Visible electromagnetic radiation having wavelengths from about 360 or 400 nanometers, just longer than ultraviolet radiation, to about 760 or 800 nanometers, just shorter than infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation—Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared range having wavelengths between about 3,000 and 5,000 nm (i.e., 3 and 5 µm) and between about 7,000 or 8,000 and 14,000 nm (i.e., 7 or 8 and 14 µm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm), (B) short-wave infrared (SWIR) (from about 1,000 nm to about 3,000 nm), (C) mid-wave infrared (MWIR) (from about 3,000 nm to about 6,000 nm), (D) long-wave infrared (LWIR) (from about 6,000 nm to about 15,000 nm), and (E) very long-wave infrared (VLWIR) (from about 15,000 nm to about 1 mm). Portions of the infrared range, particularly portions in the far or thermal IR having wavelengths between about 0.1 and 1 mm, alternatively or additionally may be termed millimeter-wave (MMV) wavelengths.

II. OVERVIEW OF AN EXEMPLARY GIMBAL SYSTEM

FIG. 1 shows an exemplary gimbal system 10 including a turret unit 12 (also termed a gimbal apparatus) mounted to the exterior of a support platform 14. In the present illustration, support platform 14 is a vehicle, namely, a helicopter 16. Gimbal system 10 may be equipped with a forced-air assembly that promotes cooling of a portion of the turret unit.

Figure 2:
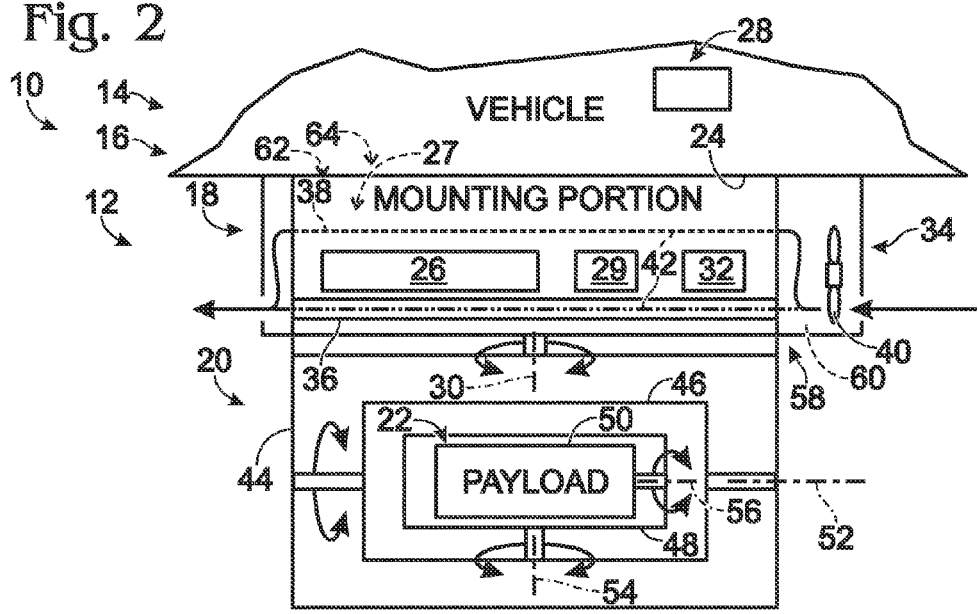
FIG. 2 is a schematic view of selected aspects of the gimbal system of FIG. 1, in accordance with aspects of the present disclosure.

FIG. 2 shows a schematic view of selected aspects of system 10. Turret unit 12 may include a support portion 18 (which, in some cases, may be described as or may include a mounting portion and/or control portion), a gimbal assembly 20, and a payload 22. Support portion 18 may be attachable to support platform 14, and optionally may be fixed to the support platform, such that the support portion is at least substantially stationary with respect to the support platform. Gimbal assembly 20 may be connected to and supported pivotably by support portion 18. Thus, the support portion may function as a connecting bridge between support platform 14 and gimbal assembly 20. Payload 22, in turn, may be connected to and supported by gimbal assembly 20, and may be oriented controllably with respect to the support portion (and the support platform) by driven motion (e.g., motor-driven motion) of gimbal assembly 20.

Support portion 18 alone or collectively with gimbal assembly 20 may define a chamber 24 (i.e., an enclosed internal volume) in which internal components of the support portion may be disposed. The chamber may be occupied by the internal components and also by an internal fluid, such as an internal gas (e.g., air), in the remaining space, if any, adjacent the internal components. The chamber may be desiccated and is enclosed substantially (although not necessarily sealed hermetically), to protect the internal components from water vapor, dust, rain, snow, debris, insects, etc. These internal components may include one or more electronic components (e.g., one or more circuit boards, digital processors, other electronic devices, or the like), generally termed electronics 26, which may generate substantial heat, but which may be relatively heat sensitive. Electronics 26 may form at least a portion of a controller 27 of the turret unit. The controller may be in communication with a user interface unit 28, which may permit a user to communicate with the controller, such as by inputting commands to the controller and/or receiving data (e.g., image and/or video data) from the controller. Also, the support portion may comprise a drive assembly 29 to drive pivotal motion of the gimbal assembly with respect to the support portion about a first axis 30 (e.g., an azimuthal axis). The drive assembly may include a drive motor, one or more gears, and the like. Furthermore, the support portion may comprise a pointing sensor 32 (e.g., an encoder), a bearing, and the like.

Support portion 18 may be equipped with a forced-air assembly 34. The forced-air assembly may include an exterior duct 36 (and/or an interior duct 38) and a forced-air device, such as a fan 40. The fan may drive airflow, indicated at 42, through a channel defined by the duct to remove heat from heat rejection surfaces of the support portion. Moreover, the channel of duct 38 and chamber 24 may be arranged for heat transfer from the chamber to the channel. For example, the channel and the chamber may be separated, at least in part, by a heat-conductive structure, such as a heat-conductive wall (e.g., formed of metal), which may conduct heat from the chamber to the channel. The heat-conductive structure may bound at least a portion of the chamber and the channel. For example, the heat-conductive structure may include a wall, such as a side wall of a housing of the support portion that defines at least a portion of the chamber and at least a portion of the channel.

The channel may be isolated fully or at least substantially from the chamber. For example, the support portion may define no openings that provide fluid communication between the channel and the chamber at any position along the channel. Alternatively, or in addition, external air being driven through the channel may be restricted from entering the chamber by at least one wall isolating the channel from the chamber along an entire length of the channel. Accordingly, while external air is being driven through the channel, the external air in the channel does not substantially enter the chamber (e.g., no more than a minor fraction of the external air in the channel enters the chamber, such as less than about 1% or 0.1%, among others).

Turret unit 12 may be utilized to aim payload 22, such as a camera, with respect to support platform 14. In particular, the turret unit may aim the payload by controlled pivotal movement of constituent gimbals 44-50 of gimbal assembly 20 relative to support platform 14. For example, the angular orientation of the payload may be adjusted horizontally and vertically via the gimbals without changing the orientation of the support platform. Accordingly, the turret unit may allow one or more fixed and/or moving objects/scenes to be detected over time from a fixed and/or moving support platform 14.

Gimbal assembly 20 may include, among others, an outer gimbal 44 (also termed an azimuthal gimbal) and an inner gimbal 46 (also termed an elevational gimbal). Gimbal assembly 20 may be coupled pivotably to support portion 18 via outer gimbal 44, for controlled, driven pivotal movement of the entire gimbal assembly (and the outer gimbal) about first axis 30 (e.g., a generally vertical axis). Inner gimbal 46 may be pivotably coupled to support portion 18 through outer gimbal 44, such that the outer gimbal carries the inner gimbal. Inner gimbal 46 may undergo pivotal movement about a second axis 52 (e.g., a generally horizontal axis, also termed an elevational axis) that is nonparallel (e.g., transverse and/or orthogonal) to first axis 30. Payload 22 may be connected to support portion 18 via inner gimbal 46. Accordingly, pivotal movement of outer gimbal 44 and/or inner gimbal 46 may aim the payload in relation to first and second axes 30, 52. In some embodiments, the payload may be connected pivotably to inner gimbal 46 via one or more additional gimbals 48, 50 that pivot about one or more additional axes 54, 56. For example, controlled pivotal movement of outer and inner gimbals 44, 46 (major gimbals) may provide coarser adjustments to the orientation of payload 22, and controlled pivotal movement of additional gimbals 48, 50 (minor gimbals) may provide finer adjustments to the orientation (or vice versa).

Turret unit 12 may include a thermal regulation system 58. System 58 may operate to provide feedback-regulated control of temperature within the turret unit, and particularly support portion 18. Accordingly, thermal regulation system 58 may be arranged to function as a closed loop. Thermal regulation system 58 may include a controller (e.g., controller 27) operatively coupled to fan 40 and a thermal sensor 60. A thermal aspect of turret unit 12 (e.g., a temperature in, on, or about support portion 18) may be measured by the thermal sensor and communicated to the controller as a measured signal(s). Based on this measured signal(s), the controller may send a control signal(s) to the fan, to control operation of the fan, for example, turning the fan on, off, or adjusting its speed, among others. The thermal consequences, if any, of this fan control then may be measured with the thermal sensor, to provide feedback to the controller about fan control, thereby closing the control loop.

Turret unit 12 may include a position control system 62. System 62 may operate to provide controlled positioning of the payload. The position control system may include controller 27, a driver(s) (e.g., a driver for each gimbal), and an encoder(s) (e.g., an encoder for each gimbal). The driver(s) may drive pivotal movement of each gimbal under the control of the controller. The encoder(s) may measure the position of the gimbal before, during, and/or after movement of each gimbal by the driver(s), to provide feedback information to the controller for further operation of the driver(s) and/or to allow the current position of a gimbal to be recorded and/or reported. The position control system further may include one or more gyroscopes to stabilize the position of the gimbals and/or the payload.

Turret unit 12 may include a power supply 64. The power supply may include any mechanism for supplying power, such as electrical power, to thermal regulation system 58, position control system 62, and electronics 26, among others. Suitable power supplies may generate, condition, and/or deliver power, including AC and/or DC power, in continuous and/or pulsed modes. Exemplary power supplies may include batteries, AC-to-DC converters, DC-to-AC converters, and so on.

Additional features and aspects that may be suitable for the gimbal system are disclosed in U.S. Patent Application Publication No. 2007/0194170 A1, published Aug. 23, 2007, which is incorporated herein by reference.

III. SUPPORT PORTIONS

A support portion may be any part of a gimbal system that supports a gimbal assembly. In some cases, the support portion may be or include a mounting/control portion that connects a gimbal assembly to a support platform and/or that carries electronics providing one or more aspects of gimbal system control and/or data processing. The support portion may form an end region of a turret unit. Also, this portion may be unstabilized and may be termed a "skillet."

The support portion may support a gimbal assembly and may be connected directly to at least one gimbal and connected indirectly to one or more additional gimbals of the gimbal assembly. The support portion, in turn, may be attached to a support platform (see Section VII) or may rest upon a support platform without attachment thereto. The support portion may be mounted to a support platform via any suitable mechanism, with any suitable orientation. For example, when used with a vehicle, a support portion (and/or the corresponding turret unit) may be bottom-mounted, side-mounted, top-mounted, front-mounted, rear-mounted, externally mounted, internally mounted, and/or so on. Moreover, such mounting may be static or dynamic, for example, involving additional gimbal(s) to provide dynamic mounting. The support portion may carry and/or contain any suitable components of a turret unit, including a controller(s), power supply, electrical conduits or other electrical circuitry, a fan(s), and/or the like.

The support portion may have any suitable shape. In some embodiments, the support portion may be at least generally cylindrical, and, if cylindrical, shaped at least generally as a disc.

IV. GIMBAL ASSEMBLIES

A gimbal assembly, as used herein, is a hierarchical arrangement of two or more pivotable members (gimbals). A gimbal assembly may include a higher-order gimbal pivotally coupled directly to a support portion. The gimbal assembly also may include a lower-order gimbal pivotally coupled directly to the higher-order gimbal and indirectly to the support portion, such that the lower-order gimbal is carried by the higher-order gimbal. As a result, pivotal motion of the higher-order gimbal in relation to the support portion results in collective pivotal motion of both gimbals, whereas pivotal motion of the lower-order gimbal may be independent of the higher-order gimbal. The gimbal assembly further may include any suitable number of additional lower-order gimbals that are pivotally coupled directly to a relatively higher-order gimbal and/or that carry an even lower-order gimbal.

A gimbal assembly may be configured to rotate a payload about any suitable or desired number of axes, including 2, 3, 4, 5, 6, or more axes. In some embodiments, some of the axes of rotation may be collinear or coplanar. The axes of rotation typically are either orthogonal to one another or parallel to (including collinear with) one another, although this is not required. In some embodiments, parallel axes of rotation, or substantially parallel axes, can be used to provide increased precision, with a first level of rotation about a first axis providing coarser large-magnitude adjustments and a second level of rotation about a second axis (parallel or nonparallel) to the first axis providing finer small-magnitude adjustments.

Each gimbal of a gimbal assembly may be capable of any suitable pivotal motion. The pivotal motion may be a complete revolution (360 degrees) or less than a complete revolution. In some embodiments, the gimbal assembly may include a hierarchical arrangement of major and minor gimbal pairs. The major gimbal pair may be a pair of gimbals having a relatively larger range of angular motion (such as greater than about 90 degrees). The minor gimbal pair may be a pair of gimbals that are pivotally coupled to the major gimbal pair (and indirectly to the support portion) and having a relatively smaller range of angular motion (such as less than about 90 degrees).

Each gimbal of a gimbal assembly may be driven controllably by a driver. An exemplary driver that may be suitable is described in U.S. Pat. No. 7,561,784, issued Jul. 14, 2009, which is incorporated herein by reference.

V. PAYLOADS

A payload is any device that is carried and aimed by a gimbal assembly. The payload may include one or more detectors and/or emitters, among others. A detector generally comprises any mechanism for detecting a suitable or desired signal, such as electromagnetic radiation, an electric field, a magnetic field, a pressure or pressure difference (e.g., sonic energy), a temperature or temperature difference (e.g., thermal energy), a particle or particles (e.g., high energy particles), movement (e.g., an inertial measurement device), and/or the like. An emitter generally comprises any mechanism for emitting a suitable or desired signal, such as electromagnetic radiation (e.g., via a laser), sonic energy, and/or the like. The payload generally is in communication with a controller that sends signals to and/or receives signals from the payload. The payload may be coupled (generally via a controller) to a display such that signals from the payload may be formatted into a visual form for viewing on the display. The present disclosure may be especially useful when the payload contains high heat-emitting components, such as lasers, radars, millimeter-wave (MMW) imagers, light detection and ranging (LIDAR) imagers, mine-detection sensors, and/or inertial measurement units (IMUS).

In some embodiments, the payload may form a detection portion (or all) of an imaging system. An imaging system generally comprises any device or assembly of devices configured to generate an image, or an image signal, based on received energy, such as electromagnetic radiation. Generally, an imaging system detects spatially distributed imaging energy (e.g., visible light and/or infrared radiation, among others) and converts it to a representative signal. Imaging may involve optically forming a duplicate, counterpart, and/or other representative reproduction of an object or scene, especially using a mirror and/or lens. Detecting may involve recording such a duplicate, counterpart, and/or other representative reproduction, in analog or digital formats, especially using film and/or digital recording mechanisms. Accordingly, an imaging system may include an analog camera that receives radiation (e.g., optical radiation) and exposes film based on the received radiation, thus producing an image on the film. Alternatively, or in addition, an imaging system may include a digital camera that receives radiation (e.g., optical radiation) and generates a digital image signal that includes information that can be used to generate an image that visually portrays the received radiation. Alternatively, or in addition, an imaging system may include an active component such as a laser to illuminate a scene and form an image from one or more reflections of the laser. "Imaging energy," as used herein, may include any type of energy, particularly electromagnetic energy, from which an image can be generated, including but not limited to ultraviolet radiation, visible light, and infrared radiation.

Suitable detectors for an imaging system may include (1) array detectors, such as charge-coupled devices (CODs), charge-injection devices (CIDs), complementary metal-oxide semiconductor (CMOS) arrays, photodiode arrays, microbolometers, and the like, and/or (2) arrays of point detectors, such as photomultiplier tubes (PMTS), photodiodes, pin photodiodes, avalanche photodiodes, photocells, phototubes, and the like. Detectors may be sensitive to the intensity, wavelength, polarization, and/or coherence of the detected imaging energy, among other properties, as well as spatial and/or temporal variations thereof.

The imaging system also may include optics (i.e., one or more optical elements). Exemplary optical elements may include (1) reflective elements (such as mirrors), (2) refractive elements (such as lenses), (3) transmissive or conductive elements (such as fiber optics or light guides), (4) diffractive elements (such as gratings), and/or (5) subtractive elements (such as filters), among others.

The imaging system also may contain gyroscopes and/or other elements arranged to form an inertial measurement unit (IMU) on an optical bench. The IMU may be used to assess the pointing angle of the line-of-sight, as well as geo-location, geo-referencing, geo-pointing, and/or geo-tracking in earth coordinates.

In some embodiments, the imaging system may be capable of generating image signals based on reflection from a self-contained laser and/or other light or radiation source. The generated image may or may not contain range information. Such imagers may generate large amounts of heat. The present disclosure may enable the use and incorporation of light detection and ranging (LIDAR) systems, such as 3-D LIDAR systems, into gimbal systems in which the large amounts of associated heat would otherwise prevent their use.

In some embodiments, an imaging system may be capable of generating image signals based on two or more different types or wavebands of imaging energy. For example, the imaging system may be configured to generate a first image signal representative of visible light and a second image signal representative of infrared radiation. Visible light and infrared radiation are both types of electromagnetic radiation (see Definitions); however, they are characterized by different wavebands of electromagnetic radiation that may contain or reflect different information that may be used for different purposes. For example, visible light may be used to generate an image signal that in turn may be used to create a photograph or movie showing how a scene appears to a human observer. In contrast, infrared radiation may be used to generate an image signal that in turn may be used to create a heat profile showing heat intensity information for a scene. More generally, the imaging system may be used with any suitable set of first and second (or first, second, and third (and so on)) image signals, using any suitable wavelength bands. These suitable image signals may include first and second visible wavebands, first and second infrared wavebands, mixtures of visible, infrared, and/or ultraviolet wavebands, and so on, depending on the application.

In some examples, an imaging system may form composite images. The composite images may be straight combinations of two or more other images. However, in some cases, one or both of the images may be processed prior to or during the process of combining the images. Composite images may be formed for use in firefighting, aeronautics, surveillance, and/or the like, for example, by superimposing infrared images of hot spots, runway lights, persons, and/or the like on visible images.

The payload alternatively, or in addition, may include non-imaging systems, such as laser rangefinders, laser designators, laser communication devices, polarimeters, hyperspectral sensors, and/or the like.

Further aspects of imaging systems that may be suitable for the gimbal system of the present disclosure are described in the following patent, which is incorporated herein by reference: U.S. Pat. No. 7,515,767, issued Apr. 7, 2009.

VI. FORCED AIR AND THERMAL REGULATION SYSTEMS

The gimbal system of the present disclosure may include any suitable device and/or arrangement of devices to influence the temperature of any suitable portion of a turret unit. The device(s) generally includes at least one forced-air device and may include one or more sensors or controllers operatively coupled to the forced-air device.

A forced-air device, such as a fan, is any device that drives the flow of air. A forced-air device thus may include any air-driving structure that promotes formation of an air current. The forced-air device may be formed, for example, by a blade(s), a vane(s), a propeller, an impeller, and/or the like. The forced-air device may drive air in any suitable direction between inflow and outflow paths, including axially, radially, orthogonally, transversely, converging, diverging, and/or the like. Accordingly, exemplary forced-air devices that may be suitable include axial fans (e.g., propeller, tube-axial, and/or vane-axial fans, among others), centrifugal fans, radial fans, cross-flow fans, positive-displacement blowers, helical screw blowers, single-stage and multi-stage centrifugal blowers, regenerative blowers, liquid ring blowers, an array of synthetic air jets, and/or the like.

A forced-air device generally also includes a motor to drive movement of the air-driving structure of the device. The motor may be operated in one direction only or reversibly, generally to reverse the flow of air. Any suitable motor may be used, including a DC, AC, or universal (AC or DC) motor. The motor may be coupled directly to the air-driving structure and/or indirectly via a belt(s), a chain(s), a gear(s), a screw(s), and/or via induction, among others.

A forced-air device also may include a mounting structure, such as a frame. The frame may hold the air-driving structure, the motor, and/or additional device components. Furthermore, the frame may position the forced-air device within a support portion of a turret unit, for example, by attachment of the frame to a housing of the support portion. The frame may be attached fixedly or pivotally to a housing structure of the support portion, such that the position of the frame is static or dynamic relative to the housing structure/gimbal. The frame (and/or the housing structure/gimbal) also may provide walls that direct airflow in relation to portions of the gimbal system. The walls thus may form a tunnel, a vent(s), and/or a flap(s) for defining a flow path(s) of air from and/or to the air-driving structure of the forced-air device.

The forced-air device may be operated in any suitable modes. The forced-air device may move air along a path in one direction (e.g., front to back or back to front) or may be reversible to move air controllably in either opposing direction. In addition, the forced-air device may have a single speed or may have a variable speed, for example, such that the forced-air device can move air faster or slower as appropriate. Furthermore, in some examples, the forced-air device may be oriented controllably.

Any suitable aspects of operation of the forced-air device may be controlled automatically and/or via operator input. These aspects may include actuation (on/off), speed, direction (forward or reverse), disposition (e.g., angular and/or translational disposition), a number of forced-air devices actuated (if more than one is used), and/or the like. In some embodiments, a controller may control operation of the forced-air device based on sensed/signaled aspects of the gimbal system. These sensed/signaled aspects may include a sensed or signaled temperature (in, on, and/or about the turret unit), air velocity, actuation state of the gimbal system's payload (e.g., on or off), movement of the gimbals of the gimbal system, orientation of the payload, support platform velocity, and/or the like.

The forced-air device may be operated based on a temperature sensed by a temperature sensor. The temperature sensor may be positioned to sense the temperature of any suitable portion of the gimbal system, including the temperature inside, on, or adjacent a gimbal or the support portion; the payload temperature; and/or the air temperature outside the turret unit; among others. Any suitable temperature (thermal) sensor(s) may be included in the gimbal system, including a contact or noncontact device, such as a thermocouple, a thermistor, a radiation thermometer (a pyrometer), a resistance temperature device, a thermal imager, a (liquid in glass) thermometer, and/or the like.

The controller may be configured to operate a feedback loop with the forced-air device and the temperature sensor. Accordingly, the controller may be or include, for example, a PI (proportional, integral) controller, a PID (proportional, integral, derivative) controller, and/or any other suitable feedback-based controller. The feedback loop may be used to turn the forced-air device on when some temperature criterion applies, to turn the device off when some other temperature criterion applies, and/or to control the speed, direction, and/or other aspect of the device when the same and/or yet other criteria apply.

The controller may be configured to operate the forced-air device when a high-heat dissipation component of the payload is used, such as a laser.

The controller may be configured to operate the forced-air device when a particular gimbal mode of operation is selected, such as "step-stare," in which a detailed wide-field image is created by tiling together, into a mosaic, a series of high-resolution narrow-field images.

VII. SUPPORT PLATFORMS

The gimbal system of the present disclosure may include a turret unit supported by a support platform. A support platform, as used herein, generally refers to any mechanism for holding, bearing, and/or presenting a turret unit and its payload. The support platform may be moving, movable but stationary, or fixed in relation to the earth, and may be disposed on the ground, in the air or space, or on and/or in water, among others. In any case, the support platform may be selected to complement the function of the turret unit and particularly its payload.

The support platform may be movable, such as a vehicle with or without motive power. Exemplary vehicles include a ground vehicle (e.g., a car, truck, motorcycle, tank, etc.), a watercraft (e.g., a boat, submarine, carrier, etc.), an aircraft or airborne device (e.g., a fixed-wing piloted aircraft, pilotless remote-controlled aircraft, helicopter, drone, missile, dirigible, aerostat balloon, rocket, etc.), or the like.

The support platform may be fixed in position. Exemplary fixed support platforms may include a building, an observation tower, a fence, and/or an observation platform, among others. In some embodiments, the support platform may be a temporarily stationary movable support, such as a hovering helicopter and/or a parked car, truck, or motorcycle, among others.

A gimbal system with a moving, temporarily stationary, or fixed support platform may be used for any suitable application(s). Exemplary applications for a gimbal system include navigation, targeting, search and rescue, law enforcement, firefighting, force protection, and/or surveillance, among others.

VIII. EXAMPLES

The following examples describe selected aspects of exemplary gimbal systems with forced airflow, particularly systems with external air driven through an exterior duct or an interior duct of a support portion of a turret unit. These examples are intended for illustration and should not be interpreted as limiting the entire scope of the present disclosure.

Example 1

Turret Unit with Forced Airflow Through an Exterior Duct

This example describes an exemplary turret unit 70 incorporating a forced-air assembly 72 equipped with an exterior duct 74 defining a channel 75; see FIGS. 3-7.

Figure 3:
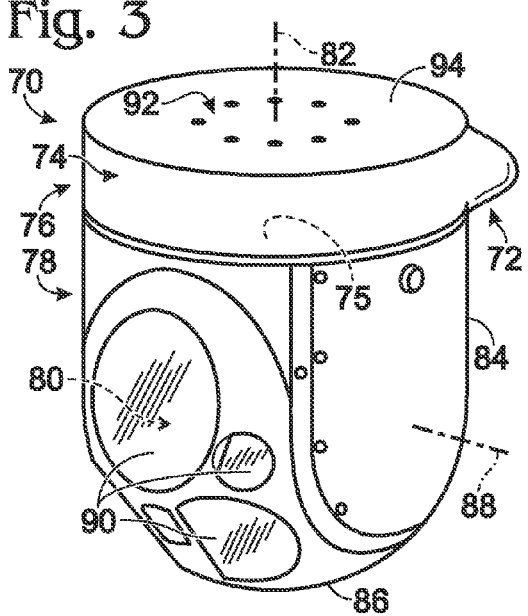
FIG. 3 is a view of an exemplary turret unit including a support portion equipped with an external forced-air assembly that may be incorporated into the gimbal system of FIG. 1, with the turret unit viewed from above and to the side of the support portion, in accordance with aspects of present disclosure.
Figure 4:
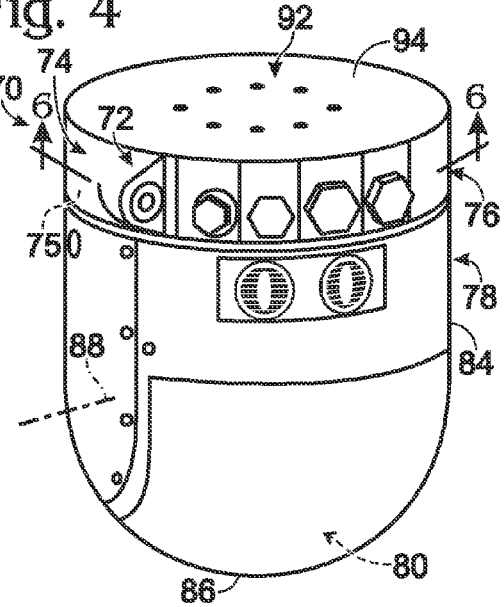
FIG. 4 is another view of the turret unit of FIG. 3, taken as in FIG. 3 but from an opposing side of the turret unit.

FIGS. 3 and 4 show turret unit 70 from opposing sides. Turret unit 70 may include a support portion 76, a gimbal assembly 78, and a payload 80 disposed within the gimbal assembly.

Gimbal assembly 78 and payload 80 may pivot collectively about a first or azimuthal axis 82 that extends through support portion 76. In particular, gimbal assembly 78 may provide an outer or azimuth gimbal 84 that abuts support portion 76 in a pivotable relationship. Also, gimbal assembly 78 may provide an inner or elevation gimbal 86, which may be at least generally spherical, and which may pivot about a second or elevational axis 88. Axes 82 and 88 may be at least substantially orthogonal to one another. Elevation gimbal 86 may house payload 80 and may include one or more optical windows 90. The windows may permit light to be received by payload 80 (e.g., by one or more optical sensors thereof) from outside the turret unit and/or to be transmitted from payload 80 (e.g., if the payload includes a light source, such as a laser).

Support portion 76 may include a bracket structure 92 that enables attachment of the turret unit to a support platform. The bracket structure may, for example, define a plurality of apertures, which may be threaded internally. In any event, the support portion may provide an abutment or end surface 94 disposed at an end of the turret unit. The end surface may define a plane disposed at least substantially orthogonal to axis 82 and may face in any suitable direction when the support portion is attached to a support platform, such as up (as shown here), down, or to the side, among others.

Figure 5:
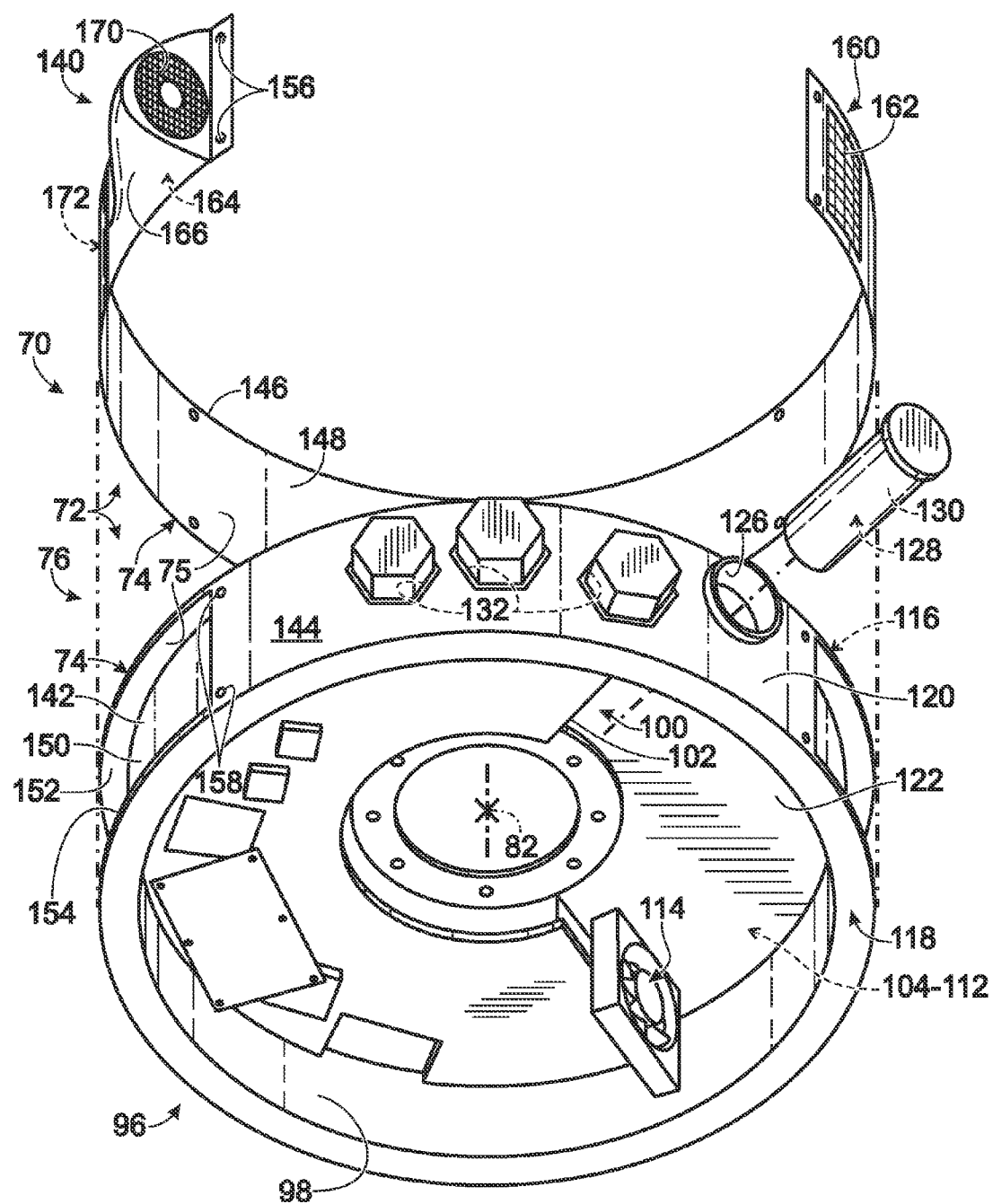
FIG. 5 is an exploded view of selected aspects of the support portion of FIGS. 3 and 4, taken generally as in FIG. 4 except from below the support portion and with other portions of the turret unit removed.
Figure 6:
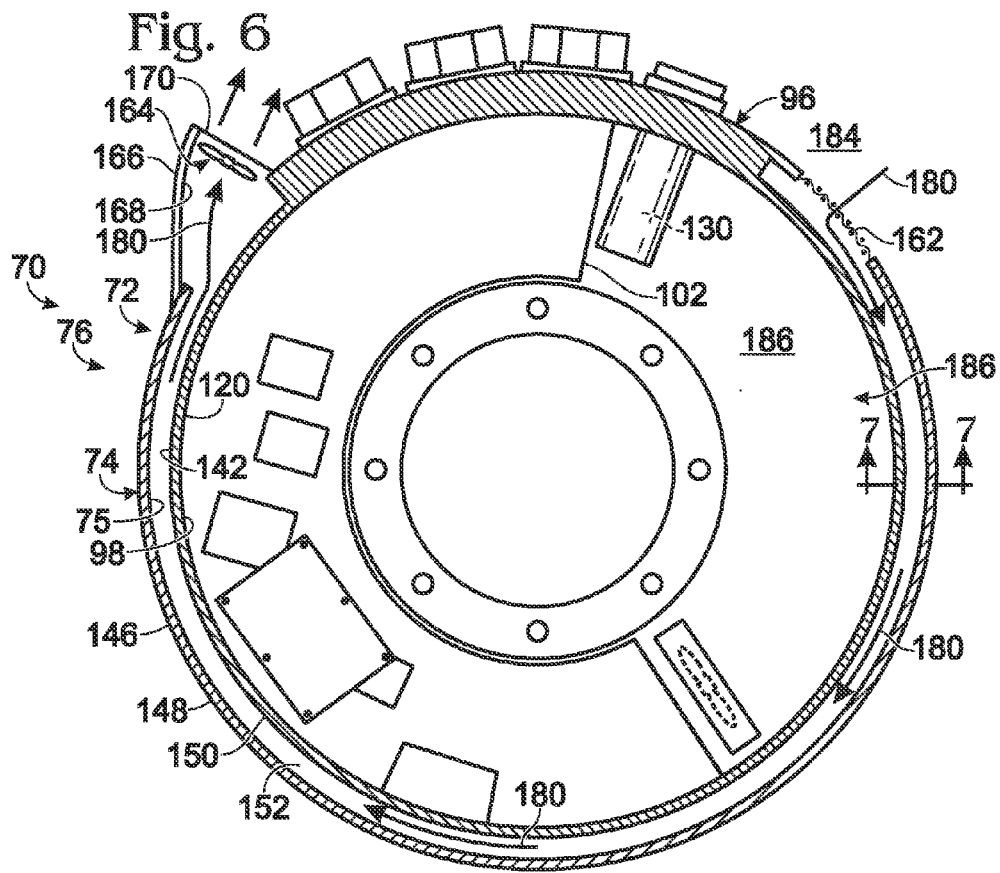
FIG. 6 is a sectional view of the turret unit of FIG. 4, taken generally along line 6-6 of FIG. 4 through the forced-air assembly.

FIG. 5 shows an exploded view of selected components of support portion 76, taken from below the support portion (relative to FIG. 3) and with the support portion separated from gimbal assembly 78 (see FIGS. 3 and 4); and FIG. 6 shows a sectional view of the support portion. Support portion 76 may include a housing 96 that at least partially defines a chamber 98 in which a plurality of components are disposed (FIG. 5). These components may include electronics 100 (e.g., held by and/or composed of one or more circuit boards 102, among others), a drive motor 104, drive gears 106, a rotary encoder 108, a bearing 110, one or more heat pipes 112 or other heat conductive elements that carry heat from one or more hot spots and/or from any of the components to a wall forming at least portion of a boundary of the chamber (e.g., a side wall of housing 96), an internal fan 114 (for air circulation within the chamber), one or more heat sinks, or any combination thereof, among others. One or more heat sources that create hot spots may be provided by any of the components, such as one or more electronic components of electronics 100.

Housing 96 may enclose chamber 98 and components therein only partially (as shown here) or at least substantially completely. The housing may have opposing ends 116, 118 and at least one side wall 120 (e.g., a circular/cylindrical side wall) forming a perimeter of the chamber between the opposing ends. Both opposing ends may be closed by end walls, or, as shown here, only one of the opposing ends (end 116) may be formed by an end wall 122 and the other opposing end (end 118) may be open. In any event, chamber 98 may be defined either by housing 96 itself or when support portion 76 is assembled with gimbal assembly 78 (see FIGS. 3 and 4). In other words, opposing end 118 may be covered by the gimbal assembly to form chamber 98 in housing 96. In some embodiments, the chamber may be at least substantially cylindrical.

The walls surrounding chamber 98 may protect components 100-112, among others, from the external environment. More particularly, the chamber may have limited (or no) fluid communication with channel 75 and/or with the ambient environment (i.e., external air and particularly external air in channel 75). For example, housing 96 may provide at least one port 126 through which air enters and exits the chamber, and the chamber may (or may not) be sealed otherwise. The port may be obstructed with a conditioning agent 128, such as a desiccant 130 and/or a filter, which may condition external air that enters the chamber, such as by removing moisture and particles and preventing entry of larger objects, among others. Additional sealable ports 132 may be provided to permit access for power and data lines.

Forced-air assembly 72 may be formed collectively by housing 96 and one or more other discrete components that are attached to the housing. For example, duct 74 may be formed, and channel 75 defined, collectively by side wall 120 and a cover assembly 140. Side wall 120 may define a recess 142 in an outer lateral surface 144 of housing 96. Recess 142 may be disposed adjacent a perimeter of housing 96, and may extend around the housing any suitable portion or all of the way around, generally at least about one-half of a complete circuit of the perimeter. Cover assembly 140, and particularly a plate region 146 thereof, may be assembled with housing 96 to provide an outer wall 148 of duct 74, while housing 96 provides an inner wall 150 and opposingly flanking upper and lower walls 152, 154 (see FIGS. 5 and 6). Cover assembly 140 and/or plate region 146 may define through-holes 156 that align with holes 158 in housing 96, to permit securement of the cover assembly with fasteners (FIG. 5). Plate region 146 also may define a vent 160, such as a screen 162, that serves as an inlet or outlet to permit ingress or egress of external air.

Cover assembly 140 also may be equipped with a fan 164 connected to a shroud 166 (FIGS. 5 and 6). The shroud may support the fan and form a void 168 (see FIG. 6), collectively with housing 96, that the fan occupies and in which the fan is at least substantially enclosed. In any event, the fan may be connected to and supported by support portion 76 in a portion of duct 74, such as at a position of the channel 75 near or at a site where the channel has an increased cross-sectional area, such as near an end of the channel. Shroud 166 may define a vent 170 to permit airflow to and/or from the fan. The shroud may be formed monolithically with plate region 146 of cover assembly 140, may be pre-attached to the plate region, or may be supplied as a discrete component that can be assembled separately with housing 96. If supplied as a discrete component, shroud 166 and plate region 146 may abut one another end-to-end, indicated at 172, when assembled with housing 96 (FIG. 5).

Fan 164 may have any suitable configuration. The fan may receive power from any suitable source. For example, the fan may receive power conductively or inductively from inside housing 96. The fan may be a fixed- or variable-speed device. In some embodiments, the fan may be a high-speed fan, with a sustained operating speed of at least 5-, 10-, or 20-thousand revolutions per minute.

FIG. 6 shows an exemplary path, indicated by arrows at 180, of forced airflow through channel 75 defined by duct 74. External air 184 may be driven into channel 75 with the air entering at screen 162, and may exit the duct adjacent fan 164. Alternatively, the external air may be driven into channel 75 adjacent fan 164 and may exit the channel at screen 162. In other words, the external air may be pulled and/or pushed through the channel by action of the fan, depending on where the fan is disposed along the flow path and the direction in which the fan drives airflow.

Heat may be removed from support portion 76 by forced flow of external air 184 through channel 75 of duct 74. Heat generated inside housing 96 (i.e., in chamber 98) may heat internal air 186 in the chamber. Heat may be transferred from internal air 186 to external air 184 in channel 75 via inner wall 150 of duct 74, which may be formed by side wall 120 of the housing, and which may provide thermal coupling of chamber 98 to channel 75. In other words, chamber 98 inside housing 96 and channel 75 outside the housing may be isolated from one another at each position along the channel by at least one wall (i.e., side wall 120) that separates one compartment from the other. The wall may be formed of a heat-conductive material, such as metal, among others. Thus, the outer surface of side wall 120 may function as a heat rejection surface, with external air flow past the side wall removing heat from the side wall, to cool the electronics in chamber 98.

Figure 7:
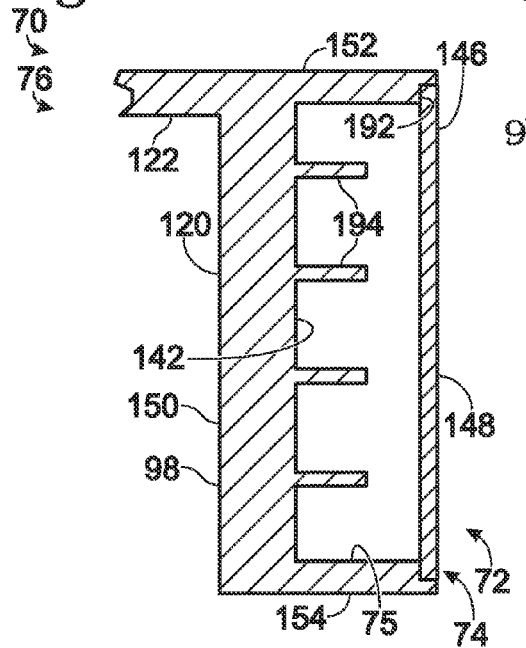
FIG. 7 is a fragmentary, sectional view of the forced-air assembly of FIG. 6, taken generally along line 7-7 of FIG. 6.

FIG. 7 show a sectional view of forced-air assembly 72. Duct 74 may be formed by covering recess 142 with plate region 146 of the cover assembly to enclose channel 75. Recess 142 may be stepped to create a secondary recess 192 in which plate region 146 is received. The outer surface of the plate region may be flush with side wall 120 of the housing when assembled with the housing. In some embodiments, side wall 120 may form a heat exchanger, such as fins 194 that project outward from a central axis of the support portion, toward outer wall 148 of duct 74. The fins may increase the surface area of channel 75, to make heat transfer more efficient.

Example 2

Turret Unit with Forced Airflow Through an Interior Duct

Figure 8:
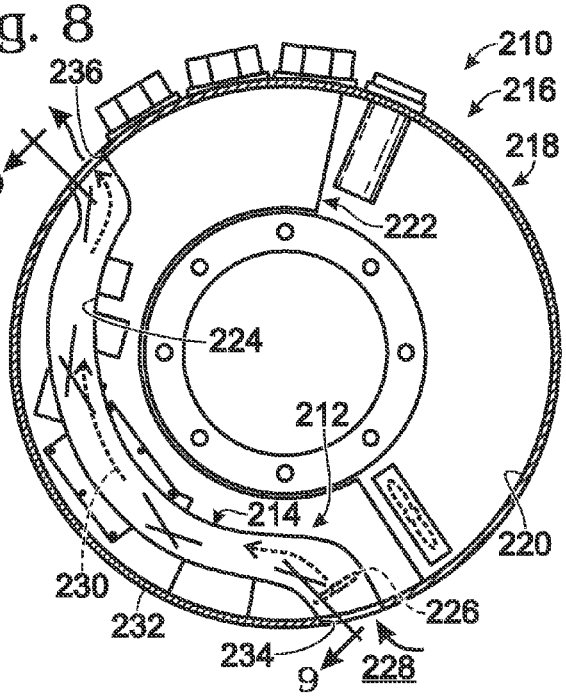
FIG. 8 is a view of selected aspects of an exemplary turret unit including an internal forced-air assembly that may be incorporated into the gimbal system of FIG. 1, with the turret unit viewed generally as in FIG. 6.

This example describes an exemplary turret unit 210 incorporating a forced-air assembly 212 equipped with an interior duct 214; see FIGS. 8 and 9.

FIG. 8 shows turret unit 210 from a similar vantage point as for turret unit 70 in FIG. 6; FIG. 9 shows a sectional view of the turret unit. Turret unit 210 may include a support portion 216 with a housing 218 at partially enclosing a chamber 220 containing electronics 222.

Forced-air assembly 212 may comprise duct 214 defining a channel 224. The assembly also may comprise a forced-air device, such as a fan 226, operatively disposed to drive external air 228 through channel 224 of the duct, indicated by flow arrows at 230. Duct may extend through chamber 220, inside the perimeter of housing 218. In other words, duct 214 may extend through chamber 220 in a spaced relation to a side wall 232 of the housing. Duct 214 also may join side wall 232 at an inlet 234 and an outlet 236 formed by openings in the side wall (FIG. 8). Duct 214 may (or may not) be spaced from opposing top and bottom ends of housing 218. For example, duct 214 may be spaced from an end wall 238 that opposes a gimbal assembly of the turret unit (FIG. 9).

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

The invention claimed is:

1. A gimbal system, comprising:
   a support portion including at least one electronic component and defining a channel;
   a gimbal assembly pivotably connected to and supported by the support portion; and
   a payload pivotably orientable with respect to the support portion by the gimbal assembly, to provide pan and tilt movement of the payload,
   wherein the support portion alone or collectively with the gimbal assembly defines a chamber that is isolated from the channel and in which the electronic component is disposed,
   wherein the support portion includes a forced-air device configured to drive flow of external air through the channel, thereby removing heat transferred to the channel from the electronic component,
   wherein the gimbal assembly includes a first gimbal supporting a second gimbal, and wherein the second gimbal includes one or more optical windows and houses the payload.

2. The gimbal system of claim 1, wherein the channel extends at least partway around the chamber.

3. The gimbal system of claim 2, wherein the gimbal assembly is pivotable about a first axis of the pair of nonparallel axes, and wherein the channel extends along a path that is at least generally centered about the first axis.

4. The gimbal system of claim 2, wherein the channel extends adjacent a perimeter of the chamber, and wherein the channel extends more than halfway around the perimeter.

5. The gimbal system of claim 1, wherein the support portion includes a housing in which the electronic component is disposed, wherein the housing includes a side wall and at least one end wall that define at least a portion of the chamber, and wherein the channel is defined collectively by the side wall and a cover assembly that attaches to the housing.

6. The gimbal system of claim 5, wherein the side wall defines a recess, and wherein the cover assembly attaches to the housing over the recess to define the channel.

7. The gimbal system of claim 1, wherein the forced-air device includes a fan, wherein the channel has a cross-sectional area that increases at a position along the channel, and wherein the fan is disposed in the channel at or near where the cross-sectional area increases.

8. The gimbal system of claim 1, wherein the chamber is defined collectively by the gimbal assembly and a housing of the support portion, wherein the housing provides a side wall and only one of two opposing end walls that bound the chamber, and wherein the gimbal assembly forms the other opposing end wall that bounds the chamber.

9. The gimbal system of claim 1, wherein the support portion includes a housing, and wherein the channel and chamber each are bounded at least partially by a same wall of the housing.

10. The gimbal system of claim 1, further comprising at least one heat pipe configured to conduct heat from the electronic component to a wall that at least partially defines the chamber.

11. The gimbal system of claim 1, wherein the support portion has an at least generally cylindrical shape.

12. The gimbal system of claim 1, wherein the support portion is a mounting portion configured to be attached to a support platform.

13. The gimbal system of claim 1, wherein the at least one electronic component includes a digital processor.

14. A gimbal system, comprising:
   a support portion including at least one electronic component;
   a gimbal assembly pivotably connected to and supported by the support portion; and
   an optical detection device in communication with the electronic component, supported by the gimbal assembly, and pivotably orientable with respect to the support portion by the gimbal assembly, to provide pan and tilt movement of the optical detection device,
   wherein the support portion alone or collectively with the gimbal assembly defines a chamber in which the electronic component is disposed,
   wherein the support portion defines a channel that extends at least substantially around the chamber,
   wherein the support portion includes a forced-air device configured to drive flow of external air through the channel, thereby removing heat transferred to the channel from the electronic component,
   wherein the support portion provides an end surface of the system that defines a plane, and wherein the gimbal assembly is collectively pivotable about an axis that is at least substantially orthogonal to the plane.

15. The gimbal system of claim 14, wherein the gimbal assembly is pivotable about a first axis of the pair of nonparallel axes, and wherein the channel extends along a path at least generally centered about the first axis.

16. The gimbal system of claim 14, wherein the support portion includes a housing in which the electronic component is disposed, wherein the housing includes a side wall and at least one end wall that define at least a portion of the chamber, and wherein the channel is defined collectively by the side wall and a cover assembly that attaches to the housing.

17. The gimbal system of claim 16, wherein the side wall defines a recess, and wherein the cover assembly attaches to the housing over the recess to define the channel.

18. The gimbal system of claim 14, wherein the forced-air device includes a fan, wherein the channel has a cross-sectional area that increases at a position along the channel, and wherein the fan is disposed in the channel at or near where the cross-sectional area increases.

19. The gimbal system of claim 14, wherein the chamber is defined collectively by the gimbal assembly and a housing of the support portion, wherein the housing includes a side wall and only one of two opposing end walls that define the chamber, and wherein the gimbal assembly forms the other opposing end wall that defines the chamber.

20. A method of cooling a gimbal system, comprising:
providing a gimbal system including (a) a support portion including at least one electronic component and defining a channel, (b) a gimbal assembly pivotably connected to and supported by the support portion, and (c) an optical detection device in communication with the electronic component, supported by the gimbal assembly, and pivotably orientable with respect to the support portion about a pair of nonparallel axes by controlled driven motion of the gimbal assembly, to provide pan and tilt movement of the optical detection device, wherein the support portion alone or collectively with the gimbal assembly defines a chamber in which the electronic component is disposed, wherein the gimbal assembly includes a first gimbal supporting a second gimbal, and wherein the second gimbal includes one or more optical windows and houses the optical detection device; and
driving external air through the channel,
wherein external air in the channel does not substantially enter the chamber.

21. The method of claim 20, wherein the step of driving external air is stopped automatically in response to one or more predefined conditions.

22. The method of claim 20, wherein the step of driving external air can be started and stopped manually via a user interface unit disposed in communication with the gimbal system.

23. The gimbal system of claim 1, wherein the second gimbal is at least generally spherical.

24. The gimbal system of claim 1, wherein the support portion is shaped at least generally as a disc.

* * * * *